3,373,211
PURIFICATION OF ALCOHOLS BY TREATMENT WITH ANHYDROUS LEWIS ACIDS
Rhea N. Watts, deceased, late of St. Francisville, La., by Beulah Smith Watts, legal representative and sole heir, St. Francisville, La., David Edward Gensheimer, Calvert City, Ky., and Joseph Kern Mertzweiller, Baton Rouge, La., assignors to Esso Research and Engineering Company, a corporation of Delaware
Continuation of application Ser. No. 268,167, Dec. 28, 1962. This application Oct. 31, 1966, Ser. No. 591,019
8 Claims. (Cl. 260—643)

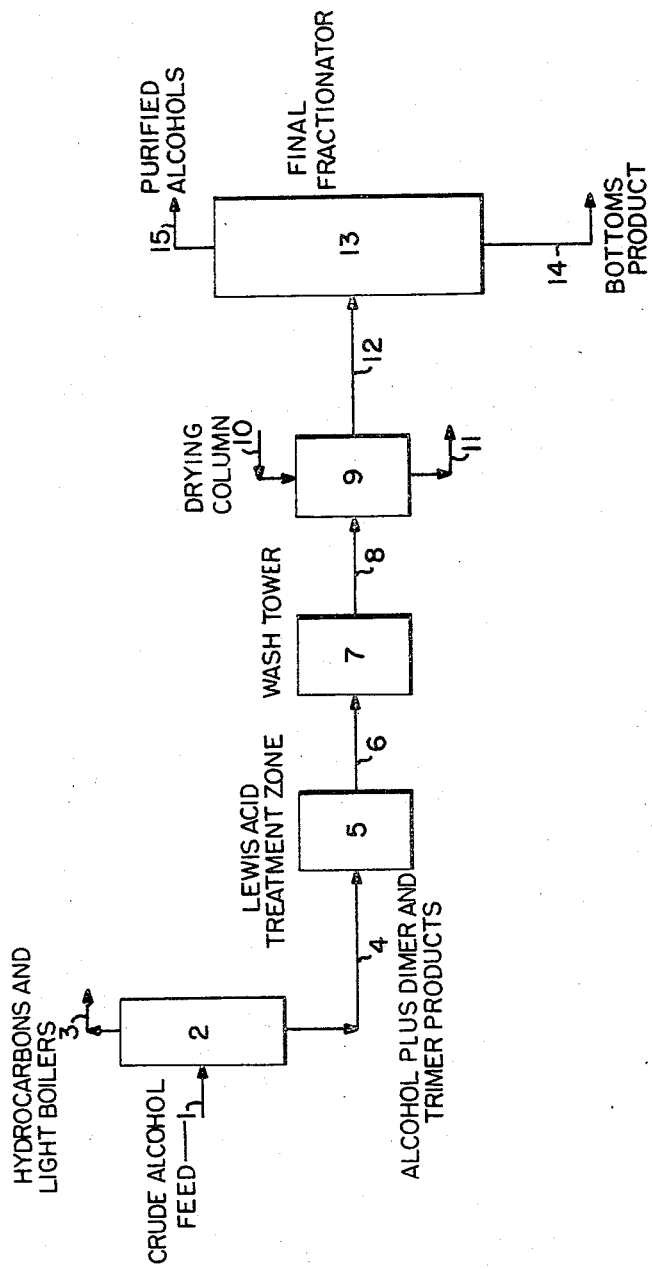

This application is a continuation of Ser. No. 268,167 filed Dec. 28, 1962 and now abandoned which is in turn a continuation-in-part of Ser. No. 807,860 filed Apr. 21, 1959, and now abandoned.

This invention relates to a process for treating alcohols which are contaminated with carbonyl compounds. In particular this invention relates to a method of treating the aforenoted alcohols to clean up contamination and to provide a purified product suitable for the production of substantially colorless plasticizer ester.

The ever expanding use of plasticizer materials such as vinyl chloride polymers or copolymers, polyvinyl acetate, cellulose esters, acrylate and methacrylate resins, rubbers such as the emulsion copolymers of butadiene and styrene or acrylonitrile or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalates, as well as the corresponding esters of maleic acid, adipic acid, azelaic acid, glycollic acid, sebacic acid or their anhydrides, have been known to be efficient plasticizers for the aformentioned high molecular weight materials. The phthalic esters, however, are characteristic of this aforesaid group and color problems resulting from the employment of contaminated alcohols will be observed regardless of the particular dibasic acid utilized in the esterification reaction. In general, therefore, the esterification reaction for producing plasticizer esters with alcohols is between an organic dibasic acid and/or its anhydride with the desired alcohol.

The above plasticizer esters are generally prepared by the esterification of a suitable alcohol, e.g. $C_6$–$C_{16}$ with an acidic reactant such as phthalic acid, the anhydride thereof or any of the acidic reactants noted above. The alcohol is employed in amounts from stoichiometric to substantial excesses and heated, in accordance with one known process in the presence of an acid catalyst such as sulfuric acid, benzene sulfonic acid, toluene sulfonic acid, naphthalene sulfonic acid or the like. Alternatively, the acid and alcohol may be reacted at higher temperatures in the absence of any catalyst or sometimes with very small amounts of catalyst. Entrainers or azeotrope formers may be utilized in the reaction to effect the removal of water at lower temperatures. Entrainers usually employed are the low boiling aromatics such as benzene, toluene, xylene and the like, paraffinic hydrocarbons of suitable boiling points, e.g. heptene and octane or olefinic materials such as diisobutylene, etc. Other acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds such as aldehydes, even in very small amounts, effect to a marked degree the color of the final ester product. To counteract the degradation of color resulting from these contaminants, many commercial esterification processes employ mild conditions and carefully control the reaction medium. Thus mild p-toluene sulfonic acid is often employed in lieu of sulfuric acid and the reaction mixture is kept free of oxygen usually by blanketing the system with $CO_2$ or other inert gases. Even with mild conditions a poor quality alcohol will result in an off-color ester product. Thermal esterification, on the other hand, results in color degradation of the product due to the contaminants in the reactants. Since no catalyst is used, higher temperatures necessarily are employed which result in off-test product depending on the amount of contaminant present.

A principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be effectively cleaned up by caustic washing, extensive distillation and similar treatments, the final alcohol product obtained in general will contain sufficient amounts of contaminants to seriously affect the utlimate color characteristic of any ester prepared therefrom. The term "carbonyl compound" is employed herein to mean those saturated or unsaturated compounds containing a

radical and those compounds which readily form aldehydic compounds. Oxo alcohols even after extensive fractionation will contain generally from 0.01 to 1.0 wt. percent of carbonyl compounds. Dimer alcohols prepared by a modified oxo route are also valuable as intermediates in the preparation of esters and are subject to the same contamination problems as the ordinary oxo alcohols. Oxo octyl alcohol, or as it is commonly called "isooctyl alcohol," comprises major amounts of dimethyl-1-hexanol and minor amounts of methyl - 1 - heptanol and smaller amounts of miscellaneous branched alcohols. Oxo decyl alcohol also varies in isomeric compositions; however, it comprises predominantly primary trimethyl heptanols.

Other oxo alcohols employable in the esterification reaction of this invention include isohexyl, tridecyl and the like. Although a single isomer may be separated from the oxo product, this is rarely done. The oxo alcohols are almost always employed in their natural combination of isomers as derived from the carbonylation synthesis. A list of typical isomeric alcohols obtained during the oxo process may be found on page 7 of the book entitled "Higher Oxo Alcohols" by Hatch, published by Enjay Co., 1957.

Another potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separable from the alcohol or separable only with extensive costly treatment. Alternatively the alkyl metal may be made directly by reaction of olefins with metal and $H_2$. An alkyl metal of this type is easily converted to alcohols in the manner described above. This invention includes the treatment of $C_2$–$C_{16}$ alcohols having the aforementioned contaminants regardless of how the alcohols are prepared.

It is therefore a primary object of this invention to remove carbonyl contamination in alcohols especially to permit the preparation of plasticizer esters having improved color properties. The present invention is especially valuable in removing carbonyl contamination from $C_6$ to $C_{16}$ alcohols prepared by a route selected from the group consisting of the carbonylation route and the alkyl metal route.

Without unduly lengthening the present specification and for the purpose of defining with more particularity some of the alcohol sources, reference may be had to U.S. Patent No. 2,637,746 to Parker, which describes in detail the oxo process, and to a copending commonly assigned application, Ser. No. 808,933, filed Apr. 27, 1959, now Patent No. 3,030,402, which is a continuation-in-part of Ser. No. 578,902, now abandoned, which describes one process for preparing alcohols via the alkyl metal route.

It has now been found that carbonyl contaminated alcohols and especially oxo alcohols containing in general from 6 to 16 carbon atoms may be purified or upgraded by treatment with substantially anhydrous Lewis acids. The term Lewis acid is well known in the art as may be seen from pages 140, 177, 573 and 577 of "Organic Chemistry" by Fieser and Fieser, 2nd ed. (1950), D. C. Heath and Company. The term anhydrous Lewis acids as used herein includes in general transition metal halides such as aluminum chloride, aluminum bromide, tin chloride, tin halide, ferric chloride and zinc chloride in substantially water-free or anhydrous form. Other Lewis acids equally applicable to the present process include anhydrous boron trifluoride, hydrogen fluoride (anhydrous liquid, B.P. 19.4°), sulfuric acid (96%), anhydrous phosphoric acid and phosphorous pentoxide. The exact mechanism of this decontamination procedure and theory is not known; however, it is believed that the contaminants in the alcohol when contacted with the substantially anhydrous Lewis acids under elevated temperatures form higher boiling compounds which are readily removed from the alcohol by distillation. To adequately effect a clean up of carbonyl compounds, the substantially anhydrous Lewis acid should be employed in an amount from 0.5 to 50 grams per liter of alcohol and preferably from 5 to 30 grams per liter of alcohol preferably for a period of at least 15 minutes to about 4 hours at temperatures from ambient to below the boiling point of alcohol. Preferred temperatures are 60 to 80° F. These conditions will vary depending on the amount of carbonyl present in the alcohol.

While the anhydrous Lewis acid treatment of the contaminated alcohol does not necessarily affect the color of the alcohol per se, the color of the final ester product, e.g., dialkyl phthalate, is considerably improved over that prepared with a non-treated alcohol reactant having the same initial quality. Since the treating agent is acidic and is itself a contaminant, it is preferably neutralized and washed from the alcohol with aqueous caustic and water in a conventional manner. The product is then fractionated to obtain an alcohol of extremely high purity and one having little or no tendency to form color bodies upon esterification.

To demonstrate the effectiveness of the present treatment, reference may now be had to the following examples (1–3) which compare the present anhydrous Lewis acid treatment with that of no treatment and plain heat soaking for both $C_6$ and $C_{10}$ alcohols.

Example 1

A $C_6$ oxo alcohol containing carbonyl contaminants was divided into 3 samples. The first sample was simply distilled in accordance with conventional practice. The second sample was heated for 4 hours at 300° F. and distilled under the identical conditions as sample 1. The third sample was treated with 20 grams of anhydrous $BF_3$ per liter at room temperature and heated for 4 hours at 300° F. and distilled. The alcohols were esterified with phthalic anhydride under standard conditions, i.e. 258–320° F. and with 4 grams/liter of sulfuric acid catalyst.

| Sample | Treatment | Ester Color |
|---|---|---|
| $C_6$ Oxo Alcohol | None (distilled) | 0.75 |
| Do | Heated, Distilled | 0.26 |
| Do | $BF_3$, Heated, Distilled | 0.22 |

The ester color refers to color readings on a Bausch and Lomb colorimeter scale at 447 mm. light wave against distilled water as a standard. For an approximate idea of the colors involved, 0.75 is an ester which is dark brown in color, 0.26 has a distinct pale yellow color, whereas 0.18 is water white to the naked eye.

Example 2

A $C_{10}$ oxo alcohol containing carbonyl contaminants was divided into 3 samples. The first sample was simply distilled in accordance with conventional practice and the alcohol was esterified with phthalic anhydride under standard conditions, i.e. 266–342° F. and with 3.7 grams/liter of sulfuric acid catalyst. The second sample was heated for 4 hours at 300° F. and distilled under the identical conditions as sample 1. The third sample was treated with 20 grams of anhydrous $AlCl_3$ per liter at 220° F. and heated for 4 hours at 300° F. and distilled with the following results:

| Sample | Treatment | Ester Color |
|---|---|---|
| $C_{10}$ Oxo Alcohol | None (distilled) | 0.67 |
| Do | Heated, Distilled | 0.30 |
| Do | $AlCl_3$ Heated, Distilled | 0.22 |

Example 3

A crude $C_{10}$ oxo alcohol obtained by oxonating $C_9$ olefin was first stabilized by removing light ends containing hydrocarbons, e.g., olefinic and paraffinic. This alcohol was then separated into two samples. Sample 1 was heated at 300° F. for 4 hours and distilled; sample 2 was treated with 20 grams of anhydrous $AlCl_3$ per liter at room temperature, and distilled with the following results:

| Sample | Treatment | Ester Color |
|---|---|---|
| $C_{10}$ Alcohol | Heated and Distilled | 0.234 |
| Do | $AlCl_3$ Treated, Distilled | 0.190 |

It is evident from the above three examples that heating coupled with distillation produced an alcohol of somewhat better quality than the starting product. However, the final ester colors obtained without the anhydrous Lewis acid treatment, i.e., 0.26, 0.30 and 0.234, are all well above specification in that they are distinctly yellow to the eye. The alcohol treated with anhydrous $BF_3$ and $AlCl_3$ produced ester colors of 0.22 and 0.190 which approach water whiteness although these alcohols still have some detectable color. In the above examples, extremely poor alcohols were employed to test the effectiveness of the anhydrous Lewis acid treatment.

To demonstrate the effect of anhydrous Lewis acid treatment on the carbonyl contaminants of the alcohol and especially correlated to ester color, reference may be had to Table I which shows treatment of a decyl alcohol prior to final fractionation but subsequent to the removal of hydrocarbons and light ends.

TABLE I

| Treatment | Stripped Alcohol | |
|---|---|---|
| | Carbonyl [1] | Ester Color [1] |
| None | .251 | .398 |
| Anhydrous $AlCl_3$ Treated: | | |
| 30 g./l., 2 hrs., 70° F | .020 | .215 |
| 10 g./l., 2 hrs. 70° F | .022 | .190 |
| 5 g./l. 2 hrs., 70° F | .034 | .200 |

[1] Precision limits on the above tests are ±0.02 for carbonyl and ±0.20 for ester color.

It is to be understood that the anhydrous Lewis acid treatment may be applied to either the finished alcohol product as it comes from the final fractionator in the conventional oxo plants or, as will be discussed in more detail subsequently, it may be applied to the alcohol stream prior to the final fractionator and subsequent to a stabilizer from which hydrocarbon and other light ends are removed. In general, the stabilizer feed comes directly from the hydrogenation unit.

To illustrate with more clarity, a complete process for the decontamination or upgrading of oxo alcohols, reference is now had to the drawing which sets forth a simplified schematic flow plan of one specific process which incorporates the acidic treat of the present invention. In the drawing, line 1 represents the alcohol feed from the hydrogenation unit of the oxo plant. This stream contains crude oxo alcohol contaminated with substantial amounts of hydrocarbon, aldehydes and high boiling polymers. The stabilizer 2 rejects hydrocarbon and other light boiling compounds via line 3 and produces relatively pure oxo alcohol via line 4. The alcohol in line 4, however, contains not only the monomer alcohol product, i.e., $C_8$ alcohol from $C_7$ olefin, but also contains high molecular weight dimer and trimer product sometimes referred to as oxo bottoms. The bottom stream from the stabilizer passes into a treating vessel 5 which may be equipped with a stirrer or other solid liquid contacting means wherein anhydrous $AlCl_3$ is admixed with the alcohol at a preferred temperature of 60 to 80° F. for a period of ½ to 3 hours and at a rate of 5 to 30 grams per liter. The treated alcohol is passed via line 6 into a wash tower 7 which may comprise several units to permit a series of aqueous caustic and water washes to thereby inactivate and remove $AlCl_3$ or other Lewis acids present. The washed product is passed via line 8 into drying column 9 which may be of any type desired. An economical and simple technique is to have staged phase separation with stripping equipment to remove residual water overhead via line 10. The aqueous water wash layer is removed via line 11 and substantially anhydrous alcohol is passed via line 12 into final fractionator 13. It is desirable and sometimes necessary to remove solids, e.g., alumina, etc., prior to fractionation. This may be done by any conventional filtration procedure. The fractionating column which may comprise from 10 to 50 plates separates the heavy product bottoms via line 14 and the purified decontaminated alcohol via line 15. Temperatures for the fractionator and stabilizer have not been given since they will obviously vary depending on the particular alcohol employed. With $C_{10}$ oxo alcohol the overhead fraction may boil between 420–460° F. and the bottoms 460+° F. With $C_6$ and $C_8$ alcohols these ranges will be correspondingly lower. It is preferred to carry out this treatment at near room temperatures, e.g. 60–80° F. in order to restrict the action of the agent to the aldehydic components.

The above process provides a novel approach to problems relating to alcohol quality and purity especially with regard to the use of these alcohols as intermediates in the production of plasticizer esters. The treating agents are in general very inexpensive and may be incorporated in existing commercial plants without substantial equipment cost. The product obtained via this process is not only decontaminated of color forming bodies but has the added advantage of containing no extraneous additives such as the various chemical reducing agents.

What is claimed is:
1. A process for purifying $C_6$ to $C_{16}$ alcohols selected from the group consisting of oxo alcohols and alcohols prepared by the oxidation and subsequent hydrolysis of aluminum alkyls and containing between about 0.01 and about 1.0 wt. percent of carbonyl compound impurities in mixture therewith which consists essentially of contacting said alcohols with from 0.5 to 50 grams per liter of a substantially anhydrous material selected from the group consisting of aluminum chloride, boron trifluoride and zinc chloride at temperatures from about room temperature to below the boiling point of the alcohol for a sufficient time to convert said carbonyl compounds to higher boiling compounds, neutralizing the treated alcohol with caustic, washing the neutralized mixture with water and then distilling the treated mixture to recover the purified alcohols overhead substantially free of carbonyl compounds.

2. A process as in claim 1 wherein said material is anhydrous aluminum chloride.

3. A process as in claim 1 wherein said material is anhydrous boron trifluoride.

4. A process as in claim 1 wherein said material is anhydrous zinc chloride.

5. In a process for producing substantially pure oxo alcohols of from six to sixteen carbon atoms per molecule wherein crude oxo alcohols containing about 0.01 to about 1.0 wt. percent of carbonyl compound impurities are fractionated in a first fractionation zone to remove unreacted hydrocarbons and other light products from said oxo alcohols and wherein said once fractionated alcohols are subsequently fractionated in a second fractionation zone to recover a desired alcohol stream, the improvement which consists essentially of treating the once fractionated alcohol stream with from 5 to 30 grams per liter of a substantially anhydrous material selected from the group consisting of aluminum chloride, boron trifluoride and zinc chloride at temperatures from room temperature to below the boiling point of said alcohol for from about 15 minutes to about 4 hours to convert said carbonyl compounds to higher boiling compounds, neutralizing the treated alcohol with caustic and washing the neutralized mixture with water and then subjecting the neutralized, washed treated alcohol to said second distillation to recover purified $C_6$ to $C_{16}$ alcohols overhead substantially free of carbonyl compounds.

6. A process as in claim 5 wherein said material is anhydrous aluminum chloride.

7. A process as in claim 5 wherein said material is anhydrous boron trifluoride.

8. A process as in claim 5 wherein said material is anhydrous zinc chloride.

References Cited
UNITED STATES PATENTS

| | | | |
|---|---|---|---|
| 3,007,973 | 11/1961 | Weiseman | 260—638 |
| 3,232,848 | 2/1966 | Johnson | 260—643 |

LEON ZITVER, *Primary Examiner.*

J. E. EVANS, *Assistant Examiner.*